US012715248B2

(12) United States Patent
Agresti et al.

(10) Patent No.: US 12,715,248 B2
(45) Date of Patent: Aug. 25, 2026

(54) HYBRID CORD AND TYRE WITH SUCH CORD

(71) Applicant: Pirelli Tyre S.p.A., Milan (IT)

(72) Inventors: Simone Agresti, Milan (IT); Guido Luigi Daghini, Milan (IT); Barbara Rampana, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 17/594,274

(22) PCT Filed: Apr. 16, 2020

(86) PCT No.: PCT/IB2020/053583
§ 371 (c)(1),
(2) Date: Oct. 8, 2021

(87) PCT Pub. No.: WO2020/212886
PCT Pub. Date: Oct. 22, 2020

(65) Prior Publication Data
US 2022/0169078 A1 Jun. 2, 2022

(30) Foreign Application Priority Data
Apr. 17, 2019 (IT) ........................ 102019000005958

(51) Int. Cl.
*B60C 9/00* (2006.01)
*B60C 9/20* (2006.01)
(Continued)

(52) U.S. Cl.
CPC ............ *B60C 9/005* (2013.01); *B60C 9/0064* (2013.01); *B60C 9/20* (2013.01); *D07B 1/0613* (2013.01);
(Continued)

(58) Field of Classification Search
CPC ..... B60C 9/0042; B60C 9/005; B60C 9/0064; B60C 69/005; B60C 69/0042
See application file for complete search history.

(56) References Cited

U.S. PATENT DOCUMENTS 3,668,857 A * 6/1972 Goy ........................ D02G 3/283 57/64
4,044,540 A * 8/1977 Toki ........................ C08J 5/06 57/902
(Continued)

FOREIGN PATENT DOCUMENTS

CN 102264553 A 11/2011
CN 102639336 A 8/2012
(Continued)

OTHER PUBLICATIONS

Notification of the First Office Action dated Jan. 11, 2023, from China National Intellectual Property Administration, in counterpart Chinese Application No. 202080027923.
(Continued)

*Primary Examiner* — Justin R Fischer
(74) *Attorney, Agent, or Firm* — Finnegan, Henderson, Farabow, Garrett & Dunner, L.L.P.

(57) ABSTRACT

A tyre for vehicle wheels comprises a support structure and a tread band arranged in a radially outer position with respect to the support structure. The support structure comprises a plurality of hybrid reinforcing cords (10) each having a plurality of monofilament textile wires (20) twisted to at least one multifilament textile yarn (30). In any cross section of the hybrid reinforcing cord (10), at least one portion of at least one monofilament textile wire (20) of said plurality of monofilament textile wires (20) defines a first radially outer surface portion of the hybrid reinforcing cord (10) and at least one portion of said at least one multifila-
(Continued)

ment textile yarn (30) defines a second radially outer surface portion of the hybrid reinforcing cord (10).

21 Claims, 4 Drawing Sheets

(51) Int. Cl.
*D07B 1/06* (2006.01)
*B60C 9/22* (2006.01)

(52) U.S. Cl.
CPC ................. *B60C 2009/0092* (2013.01); *B60C 2009/2096* (2013.01); *B60C 2009/2214* (2013.01); *D07B 2501/2046* (2013.01)

(56) References Cited

U.S. PATENT DOCUMENTS 4,343,343 A 8/1982 Reuter
4,679,387 A * 7/1987 Weidenhaupt ....... D07B 1/0613 57/902
4,947,638 A * 8/1990 Nagamine ............ D07B 1/0613 57/200
5,551,498 A 9/1996 Komatsuki
6,283,185 B1 9/2001 Rivaton
6,289,958 B1 9/2001 Dheur et al.
6,601,378 B1 * 8/2003 Fritsch ..................... D02G 3/28 57/244
7,222,481 B2 5/2007 Esnault et al.
2003/0155059 A1 8/2003 Noel et al.
2004/0265581 A1 12/2004 Esnault et al.
2005/0183808 A1 8/2005 Barguet et al.
2007/0169867 A1 7/2007 Esnault et al.
2010/0108218 A1 5/2010 Lamontia et al.
2010/0108225 A1 * 5/2010 Lamontia .............. D02G 3/442 427/207.1
2010/0224298 A1 9/2010 Rampana et al.
2010/0263781 A1 10/2010 Yamaguchi
2012/0312444 A1 12/2012 Domingo
2014/0345772 A1 11/2014 Assaad et al.
2015/0122395 A1 5/2015 Misani et al.
2016/0318343 A1 11/2016 Daghini et al.
2017/0080757 A1 * 3/2017 Aksoy ...................... D02G 3/48
2017/0210168 A1 7/2017 Lee et al.
2018/0099529 A1 4/2018 Vallet et al.
2021/0155045 A1 5/2021 Bosquet et al.

FOREIGN PATENT DOCUMENTS

CN 103209840 A 7/2013
CN 104968847 A 10/2015
CN 108136834 A 6/2018
CN 112204180 A 1/2021
EP 0 329 590 A1 8/1989
EP 0 621 143 A1 10/1994
EP 2380756 * 10/2011
EP 2380756 A1 10/2011
EP 2 806 057 A2 11/2014
EP 2806057 * 11/2014
EP 2604448 B1 * 3/2017 ........... B60C 9/0042
EP 3 196 343 A1 7/2017
JP 2000-301911 A 10/2000
WO WO-2005002884 A1 * 1/2005 ........... B60C 9/2204
WO WO-2009073761 A1 * 6/2009 ............... D02G 3/48
WO WO 2019/180367 A1 9/2019

OTHER PUBLICATIONS

International Search Report form the European Patent Office in corresponding International Application No. PCT/IB2020/053583 mailed Aug. 4, 2020.
Written Opinion of the International Searching Authority from the European Patent Office in corresponding International Application No. PCT/IB2020/053583 mailed Aug. 4, 2020.
Russian Decision of Grant dated Jun. 6, 2023, from the Federal Service for Intellectual Property Office, in counterpart Russian Application No. 202113228711(068204) (5 pages).
Notification of the Second Office Action issued by the China National Intellectual Property Administration on Jun. 28, 2023, in corresponding Application No. CN 202080027923.X (9 pages).
Notification of the Fifth Office Action issued by the China National Intellectual Property Administration on Feb. 28, 2025, in corresponding Application No. CN 202080027923.X (6 pages).

* cited by examiner

HYBRID CORD AND TYRE WITH SUCH CORD

This application is a national stage filing under 35 U.S.C. § 371 of International Application No. PCT/IB2020/053583, filed on Apr. 16, 2020, which claims the benefit of priority to Italian Priority application No. 102019000005958, filed Apr. 17, 2019; the disclosure of each of these applications are each incorporated herein by reference in their entirety.

The present invention relates to a tyre for vehicle wheels.

The tyre of the invention is, preferably, a tyre for wheels of sports automobiles, in particular high and ultra-high performance automobiles.

Tyres for high and ultra-high performance automobiles, commonly defined as "HP" or "UHP" tyres, are in particular those that allow speeds of over 200 km/h, up to more than 300 km/h, to be reached. Examples of such tyres are those belonging to classes "T", "U", "H", "V", "Z", "W", "Y", according to the E.T.R.T.O.—(European Tyre and Rim Technical Organisation) standard and the racing tyres, in particular for high-piston displacement four-wheeled vehicles. Typically, tyres belonging to such classes have a section width equal to or greater than 185 mm, preferably comprised between 195 mm and 385 mm, more preferably comprised between 195 mm and 355 mm. Such tyres are typically mounted on rims having fitting diameters equal to or greater than 13 inches, preferably not greater than 24 inches, more preferably comprised between 16 inches and 23 inches.

The tyre of the invention may however be used in vehicles different from the aforementioned automobiles, for example in high performance sports motorcycles.

The tyre of the invention comprises hybrid reinforcing cords, as defined hereinafter in this description.

PRIOR ART

Tyres with reinforcing cords comprising textile filaments of different materials twisted together are described, for example, in U.S. Pat. No. 7,222,481 B2, EP 3196343 A1, U.S. Pat. No. 4,343,343 A1, EP 329590 A1.

SUMMARY OF THE INVENTION

Throughout the present description and in the following claims, when reference is made to certain values of certain angles, they are meant as absolute values, i.e. either positive values or negative values with respect to a reference direction or plane, unless otherwise specified.

Moreover, when reference is made to any range of values comprised between a minimum value and a maximum value, the aforementioned minimum and maximum values are meant to be included in the aforementioned range, unless expressly otherwise specified.

Hereinafter the following definitions apply.

The term "equatorial plane" of the tyre is used to indicate a plane perpendicular to the rotation axis of the tyre and that divides the tyre into two symmetrically equal parts.

The terms "radial" and "axial" and the expressions "radially inner/outer" and "axially inner/outer" are used with reference, respectively, to a direction substantially parallel to the equatorial plane of the tyre and to a direction substantially perpendicular to the equatorial plane of the tyre, i.e. respectively to a direction substantially perpendicular to the rotation axis of the tyre and to a direction substantially parallel to the rotation axis of the tyre.

The terms "circumferential" and "circumferentially" are used with reference to the direction of annular extension of the tyre, i.e. to the rolling direction of the tyre, which corresponds to a direction lying on a plane coinciding with or substantially parallel to the equatorial plane of the tyre.

The term "substantially axial direction" is used to indicate a direction inclined, with respect to the equatorial plane of the tyre, by an angle comprised between about 70° and about 90°.

The term "substantially circumferential direction" is used to indicate a direction oriented, with respect to the equatorial plane of the tyre, at an angle comprised between about 0° and about 10°.

The term "elastomeric material" or "elastomer" is used to indicate a material comprising a vulcanizable natural or synthetic polymer and a reinforcing filler, wherein such a material, at room temperature and after having been subjected to vulcanization, can have deformations caused by a force and is capable of quickly and energetically recovering the substantially original shape and size after the elimination of the deforming force (according to the definitions of the ASTM D1566-11 Standard Terminology Relating To Rubber).

The expression "reinforcing cord", or more simply "cord", is used to indicate an element consisting of one or more elongated elements (also identified as "wires" or "yarns") possibly coated with, or embedded in, a matrix of elastomeric material.

Hereinafter, the expression "wire" will be used to refer to a single elongated element consisting of a single textile filament (in which case the expression "monofilament textile wire" will also be used) or even of metallic material, whereas the expression "yarn" will be used to refer to an elongated element consisting of the aggregation of a plurality of textile filaments (in which case the expression "multifilament textile yarn" will also be used).

Each filament may also be called "fibre".

The yarns can have one or more "ends", where the term "end" is used to indicate a bundle of filaments twisted together. Preferably, a single end, or at least two ends twisted together, is/are provided.

The textile reinforcing cords may be identified with a symbol that represents the textile material, the count of the fibre used and the number of ends forming the reinforcing cord. For example, a reinforcing cord with ends made of Arannid (aromatic polyamide) identified as Ar1672 indicates a cord comprising Aramid fibres with count 1670 dTex, formed of two ends twisted together.

The term "strand" is used to indicate the union of at least two wires or yarns, or of at least one wire and at least one yarn, to form an elongated element intended to be twisted with at least one other elongated element to form at least one part of the reinforcing cord.

The expression "hybrid reinforcing cord" is used to indicate a reinforcing cord comprising at least one monofilament textile wire and at least one multifilament textile yarn, the monofilament textile wire and the multifilament textile yarn being made of the same textile material or of different textile materials.

The expression "non-hybrid reinforcing cord" is used to indicate, with particular reference to the textile reinforcing cords, a reinforcing cord comprising only monofilament textile wires or only multifilament textile yarns.

The term "diameter" of a reinforcing cord, or of a wire or yarn, is used to indicate the diameter measured as prescribed by the method BISFA E10 (The International Bureau For The Standardization Of Man-Made Fibres, Internationally Agreed Methods For Testing Steel Tyre Cords, 1995 edition).

In the case of yarns, the term "diameter" is used to indicate the diameter of an ideal circumference that circumscribes all of the filaments that define the yarn.

The term "thread count" of a layer is used to indicate the number of reinforcing cords per unit of length which are provided in such a layer. The thread count is measurable in cords/dm (number of cords per decimetre).

The term "linear density" or "count" of a cord or of a wire/yarn is used to indicate the weight of the cord or of the wire/yarn per unit of length. The linear density is measurable in dtex (grams per 10 km of length). For the measurement of the linear density reference is made to flat wires/yarns, with no twists being applied in the testing step or in the twisting step, according to the tests regulated by BISFA. For example, reference is made:

for aramid fibres (AR) to:

Testing methods for para-aramid fibre yarns, 2002 Edition,

Determination of the linear density—Chapter 6

Determination of the tensile properties—Chapter 7—Test procedure—Paragraph 7.5—with procedure with initial pre tensioning; for lyocell fibres to:

Determination of the linear density—Chapter 6

Testing methods for viscose, cupro, acetate, triacetate and lyocell filament yarns—2007 Edition, Determination of tensile properties—Chapter 7—Tensile test conditions: oven dry test—Table 7.1—Test procedure—Paragraph 7.5—With oven dry test on relaxed samples—Subparagraph 7.5.2.4.

Tyres for sports automobiles require a high ability to adhere to the ground, so as to be able to effectively discharge to the ground the high drive torque which they are subjected to and, therefore, achieve high thrust and an effective braking force. Such tyres must also be light and provide an adequate response to the lateral stresses which the tyre is subjected to during cornering.

Tyres for sports automobiles typically comprise a radial carcass structure extending between opposite bead structures, a crossed belt structure arranged in a radially outer position with respect to the carcass structure, a zero-degree reinforcing layer arranged in radially outer position with respect to the crossed belt structure and a tread band arranged in a radially outer position with respect to the zero-degree reinforcing layer.

The carcass structure is intended to provide the tyre with the desired characteristics of integrity and structural strength, whereas the belt structure, in addition to contribute to the provision of the aforementioned characteristics of integrity and structural strength, is intended to transfer to the carcass structure the lateral and longitudinal stresses which the tyre is subjected to during travel upon contacting the road surface, so as to provide the tyre with the desired performance (i.e. grip, driving stability, controllability, directionality, roadholding) and comfort. The zero-degree reinforcing layer, on the other hand, is intended to limit the radial deformation of the belt structure.

For these reasons, one or more reinforcing layers are provided in the carcass structure and in the belt structure, each reinforcing layer comprising a plurality of reinforcing cords properly inclined with respect to the circumferential or rolling direction, whereas reinforcing cords oriented substantially parallel to the circumferential or rolling direction are provided in the zero-degree reinforcing layer.

In the context of the general trend to reduce $CO_2$ emissions into the atmosphere, the Applicant has considered the problem of reducing the rolling resistance of its tyres, including tyres for sports automobiles.

The Applicant has thus thought to use in its tyres for sports automobiles reinforcing cords that are as light as possible.

The Applicant has been producing and marketing for some time tyres comprising particularly light reinforcing cords made of metallic material. Each of such reinforcing cords comprises 3 steel wires twisted together, each steel wire having a diameter equal to 0.175 mm.

The Applicant has focused its attention on textile reinforcing cords.

The Applicant has observed that already only as a function of the type of elongated elements used in the reinforcing cord (monofilament textile wires, multifilament textile yarns and/or possible combination of one or more of the aforementioned wires with one or more of the aforementioned yarns) it is possible to make a plurality of hybrid reinforcing cords having characteristics such as to be theoretically suitable for being used in the carcass structure and/or in the belt structure and/or in the zero-degree reinforcing layer of tyres for sports automobiles.

In particular, the Applicant has observed that, being equal the material and the diameter, monofilament textile wires are more suitable than multifilament textile yarns for withstanding compression and bending stresses and for reducing the hysteresis caused by the mutual friction between wires and/or textile filaments, whereas multifilament textile yarns are more suitable than monofilament textile wires for withstanding tensile stresses and for adhering to the surrounding elastomeric material.

The Applicant has however also considered that in tyres for any type of vehicle it is necessary to obtain a good adhesion of the reinforcing cords with the surrounding elastomeric material. This would lead to use in the tyres reinforcing cords comprising multifilament textile yarns, thereby also obtaining a good resistance to the tensile stresses which the reinforcing cords are typically subjected to.

The Applicant has also considered that, in order to reduce the problems of hysteresis and also provide the aforementioned reinforcing cords with the desired resistance to compression and bending stresses which the reinforcing cords are typically subjected to, monofilament textile wires are more suitable, as stated above.

The Applicant has found that the aforementioned contrasting requirements may be satisfied by making a hybrid reinforcing cord comprising more than one monofilament textile wire and twisting the monofilament textile wires with at least one multifilament textile yarn so that at least one portion of the radially outer surface of the hybrid reinforcing cord is defined by at least one of the monofilament textile wires and at least one other portion of the radially outer surface of the hybrid reinforcing cord is defined by the at least one multifilament textile yarn.

The present invention therefore relates, in a first aspect thereof, to a tyre for vehicle wheels, comprising a support structure and a tread band arranged in a radially outer position with respect to the support structure.

Preferably, the support structure comprises a plurality of hybrid reinforcing cords.

Preferably, each of said hybrid reinforcing cords comprises a plurality of monofilament textile wires twisted to at least one multifilament textile yarn.

Preferably, in any cross section of the hybrid reinforcing cord, at least one portion of a monofilament textile wire of said plurality of monofilament textile wires defines a first radially outer surface portion of the hybrid reinforcing cord.

Preferably, in any cross section of the hybrid reinforcing cord, at least one portion of said at least one multifilament textile yarn defines a second radially outer surface portion of the hybrid reinforcing cord.

The Applicant has found that the provision in the hybrid reinforcing cord of the invention of many monofilament textile wires makes it possible to achieve the desired resistance to compression and bending stresses and the desired reduction of hysteresis, whereas the provision of at least one multifilament textile yarn makes it possible to achieve the desired tensile strength. Moreover, the fact that monofilament textile wires and multifilament textile yarn are mutually arranged so that the outer surface of the reinforcing cord is defined both by a portion of the at least one multifilament textile yarn and by a portion of at least one monofilament textile wire makes it possible to achieve the desired results in terms of adhesion to the surrounding elastomeric material and reduction of hysteresis.

Moreover, the twisting of the monofilament textile wires with the at least one multifilament textile yarn provides the hybrid reinforcing cord with a good behaviour under fatigue.

In a second aspect thereof, the invention relates to a hybrid reinforcing cord.

Preferably, the hybrid reinforcing cord comprises a plurality of monofilament textile wires and at least one multifilament textile yarn twisted to said plurality of monofilament textile wires.

Preferably, in any cross section of the hybrid reinforcing cord, at least one portion of a monofilament textile wire of said plurality of monofilament textile wires defines a first radially outer surface portion of the hybrid reinforcing cord and at least one portion of said at least one multifilament textile yarn defines a second radially outer surface portion of the hybrid reinforcing cord.

The Applicant believes that the hybrid reinforcing cords described above may be used in tyres of all types of vehicles where high performance is required, thus not only in sports automobiles but also for example in sports motorcycles, thus achieving the advantages discussed above.

As discussed hereinafter, the Applicant also believes that the hybrid reinforcing cords described above may be used in the carcass structure, also or only in the belt structure of the tyre and also or only in the zero-degree reinforcing layer.

The Applicant also believes that the hybrid reinforcing cords described above may be used also or only in other reinforcing components of the tyre, like for example in the reinforcing components of the tyre that are described below and are indicated as “flipper” and “chafer”, in place of the conventional metallic cords (with consequent advantages in terms of reduction of the weight of the tyre and possibility of travel of the deflated tyre with no risks of overheating the reinforcing cords) and place of the conventional textile cords comprising only multifilament textile yarns (with consequent advantages in terms of rigidity, resistance to fatigue and performance).

Moreover, the use of the hybrid reinforcing cords described above in the belt structure of the tyre reduces or completely eliminates the occurrence of interference phenomena with possible radio frequency identification (RFID) processes of the tyre and/or with signals emitted by possible sensors arranged inside the tyre, like for example pressure sensors and/or temperature sensors.

In at least one of the aforementioned aspects, the present invention can have at least one of the preferred features described hereinafter.

Preferably, said first radially outer surface portion is defined by at least one portion of at least two of said monofilament textile wires, in which case one or more of the monofilament textile wires is completely surrounded by the filaments of the multifilament textile yarn and by at least two monofilament textile wires.

However, alternative embodiments are foreseen in which said first radially outer surface portion is defined by at least one portion of each of the monofilament textile wires of said plurality of monofilament textile wires.

In a specific embodiment, about 50% of the outer surface of the hybrid reinforcing cord is defined by said at least one portion of the at least one multifilament textile yarn and about 50% of the outer surface of the hybrid reinforcing cord is defined by said at least one portion of at least one of said monofilament textile wires. This means that, considering a theoretical centre of the reinforcing cord, the angular size of said first radially outer surface portion is substantially equal to that of said second radially outer surface portion.

The angular size of said first radially outer surface portion may however be greater or lower than that of said second radially outer surface portion, in the first case promoting adhesion at the expense of hysteresis and in the second case promoting hysteresis at the expense of adhesion.

In first embodiments, said plurality of monofilament textile wires are twisted together with a predetermined first twisting pitch to form a strand of monofilament textile wires.

Preferably, said at least one multifilament textile yarn is twisted together with said strand of monofilament textile wires with a predetermined second twisting pitch.

In second embodiments, at least one first monofilament textile wire of said plurality of monofilament textile wires is twisted together with said at least one multifilament textile yarn with a predetermined first twisting pitch to form a strand of mono-multifilament textile wires.

Preferably, the aforementioned twisting pitch is greater than, or equal to, about 2 mm, more preferably greater than, or equal to, about 3 mm.

Preferably, the aforementioned twisting pitch is lower than, or equal to, about 20 mm, more preferably lower than, or equal to, about 10 mm.

In preferred embodiments, the aforementioned twisting pitch is comprised between about 2 mm and about 20 mm, preferably between about 3 mm and about 10 mm.

Preferably, at least one second monofilament textile wire of said plurality of monofilament textile wires is twisted together with said strand of mono-multifilament textile wires with a predetermined second twisting pitch.

In both the aforementioned embodiments, the first twisting pitch may be equal to or different from the second twisting pitch.

In some preferred embodiments, the first twisting pitch is different from (greater or lower than) the second twisting pitch.

In further embodiments, each monofilament textile wire of said plurality of monofilament textile wires is twisted together with at least one other monofilament textile wire of said plurality of monofilament textile wires and with said at least one multifilament textile yarn with a predetermined twisting pitch to form a strand of mono-multifilament textile wires.

Such a twisting pitch is preferably equal to the aforementioned first twisting pitch.

In all the embodiments, each monofilament textile wire of said plurality of monofilament textile wires is preferably made of aliphatic polyamide fibres (for example Nylon 6, Nylon 6.6, Nylon 4.6, Nylon 4.10, Nylon 10.10, Nylon 11, Nylon 12, Nylon 6.10, Nylon 6.12), polyester fibres (for example polybutylene terephthalate, polyethylene terephthalate, polyethylene isophthalate), polyaryletherketone fibres (for example polyetheretherketone), or mixtures thereof.

In all the embodiments, said at least one multifilament textile yarn preferably comprises filaments made of aromatic polyamide fibres, aliphatic polyamide fibres (for example Nylon 6, Nylon 6.6, Nylon 4.6, Nylon 4.10, Nylon 10.10, Nylon 11, Nylon 12, Nylon 6.10, Nylon 6.12), polyester fibres (for example polybutylene terephthalate, polyethylene terephthalate, polyethylene isophthalate), polyketone fibres, polyvinyl alcohol fibres, cellulose fibres (for example rayon, lyocell), glass fibres, carbon fibres or mixtures thereof.

Preferably, each monofilament textile wire of said plurality of monofilament textile wires has a diameter greater than, or equal to, about 0.1 mm, more preferably greater than, or equal to, about 0.2 mm.

Preferably, said diameter is lower than, or equal to, about 1 mm, more preferably lower than, or equal to, about 0.5 mm.

In preferred embodiments, said diameter is comprised between about 0.1 mm and about 1 mm, preferably between about 0.2 mm and about 0.5 mm.

Preferably, said hybrid reinforcing cord comprises a number of monofilament textile wires greater than, or equal to, 2.

Preferably, the aforementioned number of monofilament textile wires is lower than 10, more preferably lower than, or equal to, 8, even more preferably lower than, or equal to, 6.

In preferred embodiments, the aforementioned number of monofilament textile wires is comprised between 2 and 10, more preferably between 2 and 8, even more preferably between 2 and 6, for example equal to 3 or 4.

In general, preferably, the more monofilament textile wires are provided in the hybrid reinforcing cord the smaller the diameter of said monofilament textile wires.

Preferably, said at least one multifilament textile yarn has a linear density greater than, or equal to, about 400 dTex, more preferably greater than, or equal to, about 800 dTex.

Preferably, said linear density is lower than, or equal to, about 4500 dTex, more preferably lower than, or equal to, about 4000 dTex.

In preferred embodiments, said linear density is comprised between about 400 dTex and about 4500 dTex, preferably between about 800 dTex and about 4000 dTex.

Preferably, said hybrid reinforcing cord comprises a number of multifilament textile yarns greater than, or equal to, 1.

Preferably, the number of multifilament textile yarns is lower than, or equal to, 4, more preferably lower than, or equal to, 3, even more preferably lower than, or equal to, 2.

Preferably, the number of multifilament textile yarns is comprised between 1 and 4, more preferably between 1 and 3, even more preferably between 1 and 2, for example equal to 1.

In some embodiments, at least some of said hybrid reinforcing cords comprise at least one metallic wire helically wound around said plurality of monofilament textile wires and the at least one multifilament textile yarn.

The aforementioned metallic wire advantageously contributes to strengthen the reinforcing cord and to keep the monofilament textile wires firmly twisted to the multifilament textile yarn.

The winding direction of the metallic wire onto the assembly defined by the monofilament textile wires and the at least one multifilament textile yarn may or may not be coherent with the twisting direction of the monofilament textile wires with respect to the at least one multifilament textile yarn.

Preferably, the aforementioned winding direction is opposite to the aforementioned twisting direction.

Preferably, the metallic wire is wound on the aforementioned assembly with a winding pitch greater than about 2 mm, more preferably greater than about 3.5 mm.

Preferably, the metallic wire is wound on the aforementioned assembly with a winding pitch lower than about 10 mm, more preferably lower than about 5 mm.

In preferred embodiments, the metallic wire is wound on the aforementioned assembly with a winding pitch comprised between about 2 mm and about 10 mm, preferably between about 3.5 mm and about 5 mm.

Preferably, said metallic wire has a diameter greater than about 0.08 mm, more preferably greater than about 0.10 mm.

Preferably, said metallic wire has a diameter lower than about 0.20 mm, more preferably lower than about 0.15 mm.

Preferably, said metallic wire has a diameter comprised between about 0.08 mm and about 0.20 mm, more preferably between about 0.10 mm and about 0.15 mm.

Preferably, the hybrid reinforcing cords comprising the aforementioned metallic wire are used in the crossed belt structures and/or in the zero degrees belt layer and/or in the aforementioned stiffening layers.

Preferably, the filaments of said at least one multifilament textile yarn are coated with an adhesive substance, or subjected to a chemical or physical adhesivising treatment, in order to further improve the adhesion with the elastomeric material in which they are embedded or with which they are coated.

In some embodiments, said at least one multifilament textile yarn comprises at least one textile monofilament and a plurality of textile filaments.

In this case, in any cross section of the hybrid reinforcing cord said at least one textile monofilament is at least partially incorporated among said textile filaments, for example partially or completely surrounded by said textile filaments.

Each monofilament textile wire may be twisted on itself with a predetermined first twisting pitch. The Applicant has observed that such a provision can contribute to optimise the behaviour under fatigue of the reinforcing cord.

Preferably, said first twisting pitch is equal to said twisting pitch. In this way, the incorporation of the monofilament textile wires among the filaments of the respective multifilament textile yarns is maximised, to the great benefit of the adhesion of the hybrid reinforcing cord with the surrounding elastomeric material.

Said at least one multifilament textile yarn may or may not be twisted on itself with a predetermined second twisting pitch. When twisted on itself, preferably, the second twisting pitch is equal to said twisting pitch. This is provided in order to maximise the incorporation of the monofilament textile wires among the filaments of the multifilament textile yarn.

Preferably, said support structure comprises a carcass structure comprising at least one carcass layer having opposite end edges associated with (for example turned around) respective annular anchoring structures to define, on opposite sides with respect to an equatorial plane of the tyre, respective bead structures.

Preferably, said support structure comprises a crossed belt structure arranged in a radially outer position with respect to the carcass structure and in a radially inner position with respect to the tread band.

Preferably, said plurality of hybrid reinforcing cords is arranged in said carcass structure and/or in said belt structure.

The support structure may also comprise, as an alternative or in addition to the crossed belt structure, a zero-degree reinforcing layer, which may comprise non-hybrid reinforcing cords that, preferably, comprise only monofilament textile wires or multifilament textile yarns, for example made of aramid, nylon, or hybrid reinforcing cords of the type discussed above.

Preferably, said support structure comprises at least one stiffening layer associated with said at least one carcass layer at or close to a respective end edge and said plurality of hybrid reinforcing cords is arranged in said at least one stiffening layer.

Preferably, said at least one stiffening layer may be associated with said at least one carcass layer at or close to a respective bead structure.

Preferably, said at least one stiffening layer may be arranged between a respective end edge of said at least one carcass layer and a respective bead structure.

More preferably, said at least one stiffening layer may at least partially surround said bead structure. Such a stiffening layer is also indicated with the term “flipper”.

Alternatively or additionally, said at least one stiffening layer may be associated with the respective end edge of said at least one carcass layer in an axially outer position with respect to the respective annular anchoring structure.

More preferably, said at least one stiffening layer may extend from said annular anchoring structure towards said tread band. Such a stiffening layer is also indicated with the term “chafer”.

The chafer can be arranged in an axially outer or axially inner position with respect to the end edge of said at least one carcass layer. In the case in which the carcass structure comprises a plurality of carcass layers, for example two, the chafer can be arranged between the respective end edges of the various carcass layers.

In preferred embodiments of a tyre in which said plurality of hybrid reinforcing cords is arranged in the carcass structure, each of said hybrid reinforcing cords comprises three monofilament textile wires made of nylon and each having a diameter equal to about 0.21 mm and a multifilament textile yarn made of nylon and having a linear density equal to about 1400 dTex. Such a tyre is particularly suitable for being used in high and ultra-high performance automobiles as defined above.

In preferred embodiments of a tyre in which said plurality of hybrid reinforcing cords is arranged in the crossed belt structure, each of said hybrid reinforcing cords comprises three monofilament textile wires made of PET and each having a diameter equal to about 0.40 mm and a multifilament textile yarn made of aramid and having a linear density equal to about 1100 dTex. Such a tyre is particularly suitable for being used in high and ultra-high performance automobiles as defined above.

In preferred embodiments of a tyre in which said plurality of hybrid reinforcing cords is arranged in the zero degrees belt layer, each of said hybrid reinforcing cords comprises two strands twisted to one another, each of which comprising two monofilament textile wires made of PET and each having a diameter equal to about 0.20 mm and a multifilament textile yarn made of aramid twisted to the aforementioned two strands and having a linear density equal to about 1100 dTex. Also such a tyre is particularly suitable for being used in high and ultra-high performance automobiles as defined above.

In preferred embodiments of a tyre in which said plurality of hybrid reinforcing cords is arranged in said at least one stiffening layer, for example in the chafer or in the flipper, the hybrid reinforcing cords are identical to those described above in the case of use in the crossed belt structure.

DESCRIPTION OF EMBODIMENTS OF THE INVENTION

Further characteristics and advantages of the tyre of the present invention will become clearer from the following detailed description of preferred embodiments thereof, made with reference to the attached drawings. In such drawings.

Figure 1:
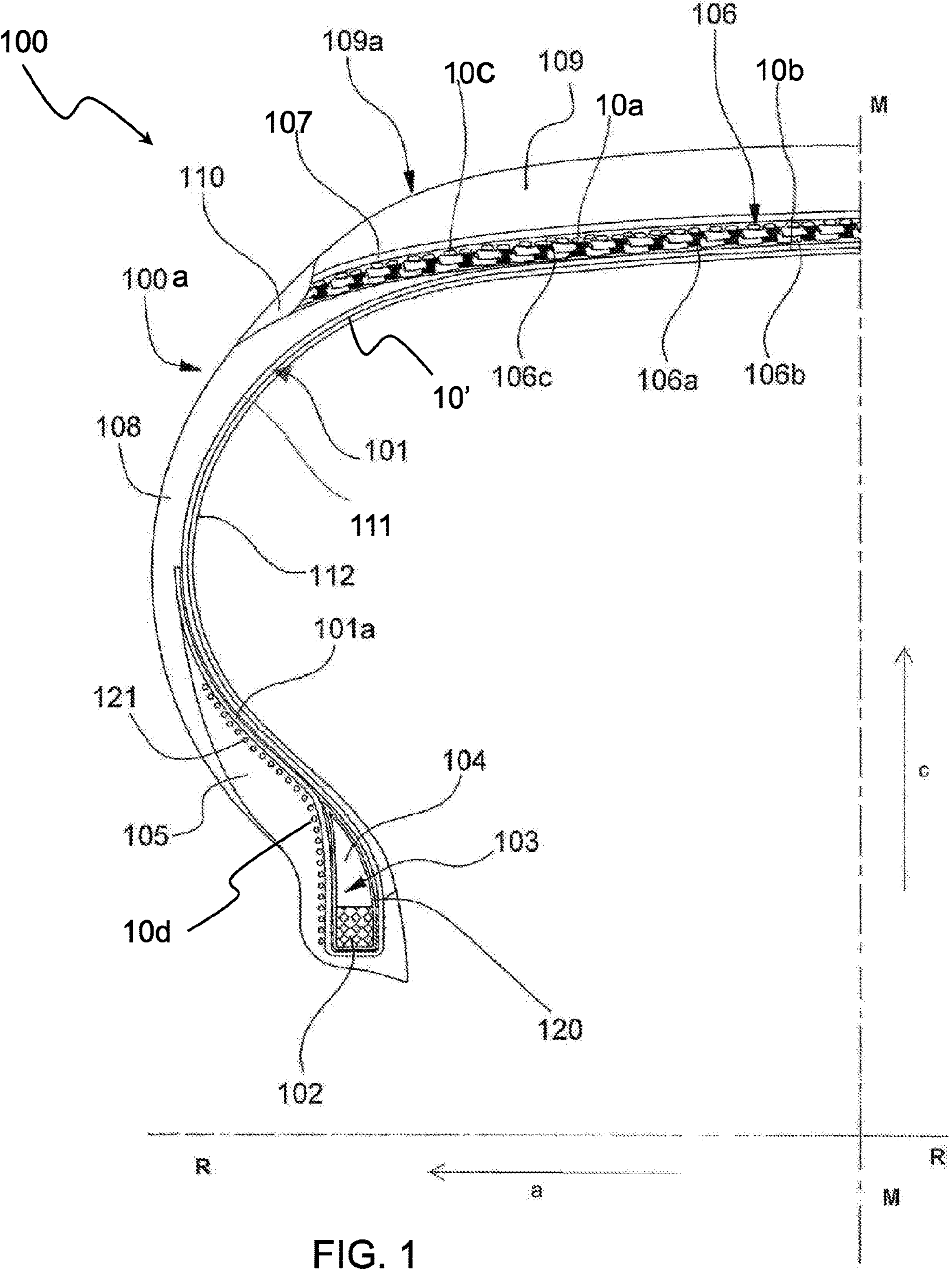
FIG. 1 is a schematic partial half cross-section view of a portion of a tyre according to an embodiment of the present invention.

For the sake of simplicity, FIG. 1 shows only a part of an embodiment of a tyre 100 in accordance with the present invention, the remaining part, which is not shown, being substantially identical and being arranged symmetrically with respect to the equatorial plane M-M of the tyre.

The tyre 100 shown in FIG. 1 is, in particular, an embodiment of a tyre for four-wheeled vehicles.

Preferably, the tyre 100 is a HP or UHP tyre for sports and/or high or ultra-high performance automobiles.

In FIG. 1 “a” indicates an axial direction, “c” indicates a radial direction, “M-M” indicates the equatorial plane of the tyre 100 and “R-R” indicates the rotation axis of the tyre 100.

The tyre 100 comprises at least one support structure **100*a* and, in a radially outer position with respect to the support structure 100*a*, a tread band 109** in elastomeric material.

The support structure **100*a* comprises a carcass structure 101, in turn comprising at least one carcass layer 111**.

Hereinafter, for the sake of simplicity of presentation, reference will be made to an embodiment of the tyre 100 comprising a single carcass layer 111. However, it is understood that what is described has analogous application in tyres comprising more than one carcass layer.

The carcass layer 111 has axially opposite end edges engaged with respective annular anchoring structures 102, called bead cores, possibly associated with an elastomeric filler 104. The area of the tyre 100 comprising the bead core 102 and the possible elastomeric filler 104 forms an annular reinforcing structure 103 called “bead structure” and intended to allow the tyre 100 to be anchored on a corresponding mounting rim, not shown.

The carcass layer 111 comprises a plurality of reinforcing cords 10' coated with an elastomeric material or embedded in a matrix of cross-linked elastomeric material.

The carcass structure 101 is of the radial type, i.e. the reinforcing cords 10' are arranged on planes comprising the rotation axis R-R of the tyre 100 and substantially perpendicular to the equatorial plane M-M of the tyre 100.

Each annular reinforcing structure 103 is associated with the carcass structure 101 through folding back (or turning) of the opposite end edges of the at least one carcass layer 111 around the bead core 102 and the possible elastomeric filler 104, so as to form the so-called turnings 101*a* of the carcass structure 101.

In an embodiment, the coupling between the carcass structure 101 and the annular reinforcing structure 103 can be made through a second carcass layer (not shown in FIG. 1) applied in a radially outer position with respect to the carcass layer 111.

An anti-abrasion strip 105 is arranged at each annular reinforcing structure 103 so as to surround the annular reinforcing structure 103 along the axially inner, axially outer and radially inner areas of the annular reinforcing structure 103, thus being arranged between the latter and the rim of the wheel when the tyre 100 is mounted on the rim. Such an anti-abrasion strip 105 may, however, not be provided.

The support structure 100*a* comprises, in a radially outer position with respect to the carcass structure 101, a crossed belt structure 106 comprising at least two belt layers 106*a*, 106*b* arranged radially superimposed over one another.

The belt layers 106*a*, 106*b* comprise a plurality of reinforcing cords 10*a*, 10*b*, respectively. Such reinforcing cords 10*a*, 10*b* have an orientation inclined with respect to the circumferential direction of the tyre 100, or to the equatorial plane M-M of the tyre 100, by an angle comprised between about 15° and about 45°, preferably between about 20° and about 40°. For example, such an angle is equal to about 30°.

The reinforcing cords 10*a*, 10*b* of a belt layer 106*a*, 106*b* are parallel to one another and have a crossed orientation with respect to the reinforcing cords of the other belt layer 106*b*, 106*a*.

In ultra-high performance tyres, the belt structure 106 may be a turned crossed belt structure. Such a belt structure is made by arranging at least one belt layer on a support element and turning the opposite lateral end edges of said at least one belt layer. Preferably, at first a first belt layer is arranged on the support element, then the support element is radially expanded, then a second belt layer is arranged on the first belt layer and finally the opposite axial end edges of the first belt layer are turned on the second belt layer to at least partially cover the second belt layer, which is the radially outermost one. In some cases, a third belt layer can be arranged on the second belt layer. Advantageously, the turning of the axially opposite end edges of a belt layer on another belt layer arranged in a radially outer position imparts greater reactivity and responsiveness of the tyre when entering a bend.

The support structure 100*a* comprises, in a radially outer position with respect to the crossed belt structure 106, at least one zero-degree reinforcing layer 106*c*, commonly known as "zero degrees belt". It comprises reinforcing cords 10*c* oriented in a substantially circumferential direction. Such reinforcing cords 10*c* thus form an angle of a few degrees with respect to the equatorial plane M-M of the tyre 100.

The reinforcing cords 10*a*, 10*b*, 10*c* are coated with an elastomeric material or embedded in a matrix of cross-linked elastomeric material.

The tread band 109 is made of elastomeric material, like other semi-finished products constituting the tyre 100, and is applied in a radially outer position with respect to the zero-degree reinforcing layer 106*c*.

Respective sidewalls 108 made of elastomeric material are also applied onto the side surfaces of the carcass structure 101, in an axially outer position with respect to the carcass structure 101 itself. Each sidewall 108 extends from one of the lateral edges of the tread band 109 up to the respective annular reinforcing structure 103.

The anti-abrasion strip 105, if provided, extends at least up to the respective sidewall 108.

In some specific embodiments, like the one shown and described here, the rigidity of the sidewall 108 can be improved by providing a stiffening layer 120, generally known as "flipper" or additional strip-like insert, and which has the function of increasing the rigidity and integrity of the annular reinforcing structure 103 and of the sidewall 108.

The flipper 120 is wound around a respective bead core 102 and the elastomeric filler 104 so as to at least partially surround the annular reinforcing structure 103. In particular, the flipper 120 surrounds the annular reinforcing structure 103 along the axially inner, axially outer and radially inner areas of the annular reinforcing structure 103.

The flipper 120 is arranged between the turned end edge of the carcass layer 111 and the respective annular reinforcing structure 103. Usually, the flipper 120 is in contact with the carcass layer 111 and the annular reinforcing structure 103.

In some specific embodiments, like the one shown and described here, the bead structure 103 may also comprise a further stiffening layer 121 that is generally known with the term "chafer", or protective strip, and which has the function of increasing the rigidity and integrity of the annular reinforcing structure 103.

The chafer 121 is associated with a respective turned end edge of the carcass layer 111 in an axially outer position with respect to the respective annular reinforcing structure 103 and extends radially towards the sidewall 108 and the tread band 109.

The flipper 120 and the chafer 121 comprise reinforcing cords 10*d* (in the attached figures those of the flipper 120 are not visible) coated with an elastomeric material or embedded in a matrix of cross-linked elastomeric material.

The tread band 109 has, in a radially outer position thereof, a rolling surface 109*a* intended to contact the ground. The rolling surface 109*a* has circumferential grooves (not shown in FIG. 1) formed thereon, said grooves being connected by transversal notches (not shown in FIG. 1) so as to define on the rolling surface 109*a* a plurality of blocks of various shapes and sizes (not shown in FIG. 1).

An underlayer 107 is arranged between the crossed belt structure 106 and the tread band 109.

In some specific embodiments, like the one shown and described here, a strip 110 consisting of elastomeric material, commonly known as "mini-sidewall", can optionally be provided in the connection area between the sidewalls 108 and the tread band 109. The mini-sidewall 110 is generally obtained through co-extrusion with the tread band 109 and allows an improvement of the mechanical interaction between the tread band 109 and the sidewalls 108.

Preferably, an end portion of the sidewall 108 directly covers the lateral edge of the tread band 109.

In the case of tubeless tyres, a layer of rubber 112, generally known as "liner", can also be provided in a radially inner position with respect to the carcass layer 111 to provide the necessary impermeability to the inflation air of the tyre 100.

At least some of the reinforcing cords 10' (preferably all of the reinforcing cords 10' provided in the carcass layer 111) and/or of the reinforcing cords 10*a*, 10*b* (preferably all of the reinforcing cords 10*a* provided in the belt layer 106*a* and all of the reinforcing cords 10*b* provided in the belt layer 106*b*, even in the case in which the belt structure 106 is a turned crossed belt structure) and/or of the reinforcing cords 10*c* of the zero-degree reinforcing layer 106*c*, and/or of the reinforcing cords 10*d* of the flipper 120 and/or of the chafer 121 are hybrid reinforcing cords 10 of the type shown in FIGS. 2-6 and described below.

Figures 2, 3:
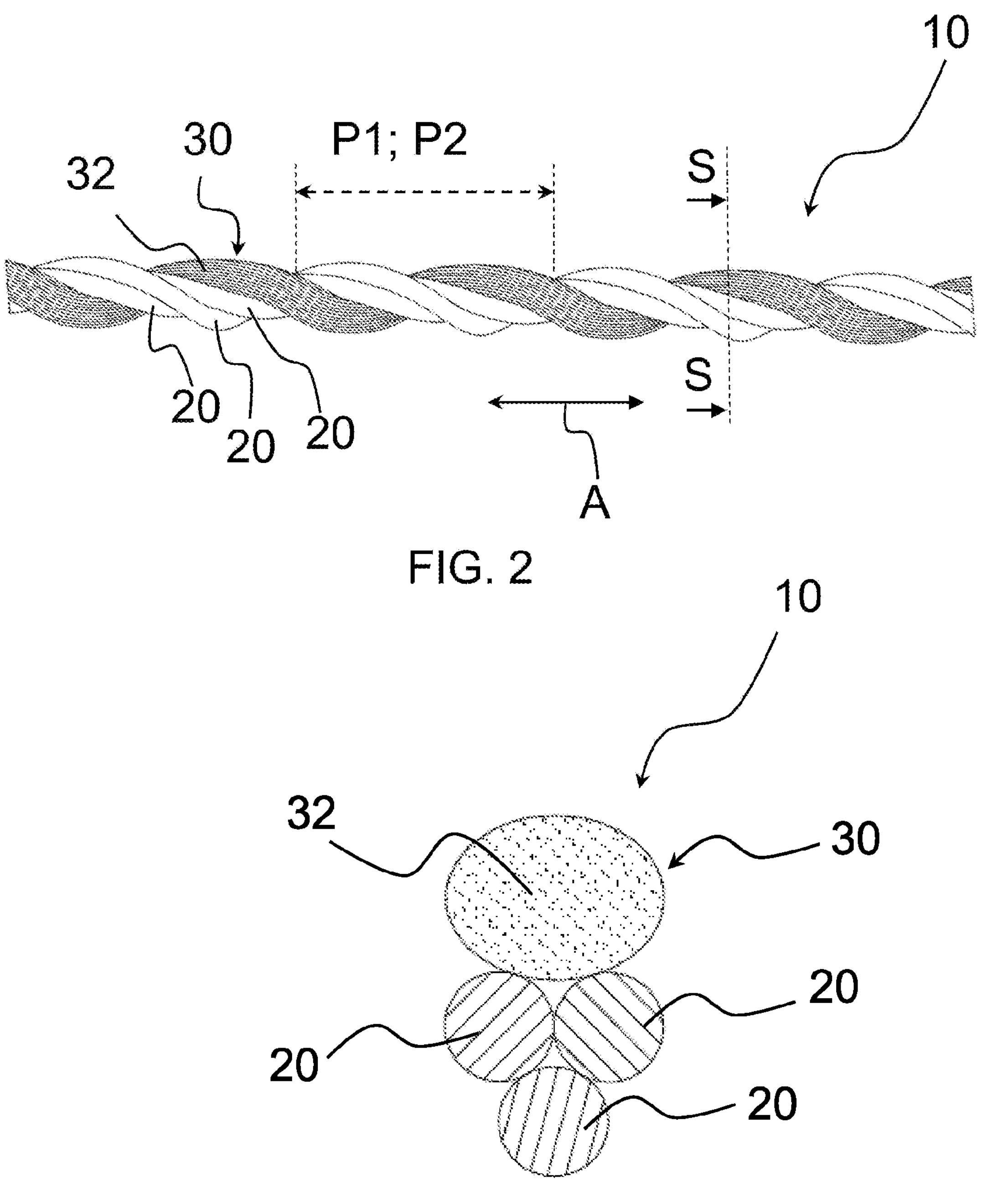
FIG. 2 is a schematic side view of a piece of a first embodiment of a hybrid reinforcing cord used in the tyre of FIG. 1.
FIG. 3 is a schematic enlarged view of a cross section of the hybrid reinforcing cord of FIG. 2, such a cross section being taken on the section plane S-S drawn in FIG. 2.

With reference to FIGS. 2 and 3, the hybrid reinforcing cord 10 comprises three monofilament textile wires 20 twisted to one another and a multifilament textile yarn 30 twisted to the three monofilament textile wires 20 with a predetermined twisting pitch and defined by a plurality of filaments 32.

Preferably, the three monofilament textile wires 20 are identical. Therefore, only one of them will be described hereinafter.

The aforementioned reinforcing cord 10 can be made in various ways.

A first way provides for an initial twisting of the three monofilament textile wires 20 with a twisting pitch P1 to form a strand of monofilament textile wires 20. Thereafter, such a strand is twisted with the multifilament textile yarn 30 with a twisting pitch P2 that can be equal to or different from the twisting pitch P1.

A second way provides for an initial twisting of one or more of the monofilament textile wires 20 with the multifilament textile yarn 30 with a twisting pitch P1 to form a strand of mono-multifilament textile wires. Thereafter, such a strand is twisted with another monofilament textile wire 20 with a twisting pitch P2 that can be equal to or different from the twisting pitch P1.

A third way provides for a single twisting operation in which each of the monofilament textile wires 20 is twisted together with the other monofilament textile wires 20 and with the multifilament textile yarn 30 with a predetermined twisting pitch P1 to form a strand of mono-multifilament textile wires.

In the embodiment shown in FIGS. 2 and 3, each monofilament textile wire 20 is, in any cross-section of the reinforcing cord 10 (like for example that of FIG. 3), and preferably in all of the cross-sections of the reinforcing cord 10, arranged externally with respect to the filaments 32 of the multifilament textile yarn 30.

The mutual arrangement of the monofilament textile wires 20 and of the multifilament textile yarn 30 is such that a first radially outer surface portion of the hybrid reinforcing cord 10 is defined by a portion of each of the three monofilament textile wires 20 and a second radially outer surface portion of the hybrid reinforcing cord 10 is defined by a portion of the multifilament textile yarn 30.

For example, about 50% of the outer surface of the hybrid reinforcing cord 10 is defined by the multifilament textile yarn 30 and the remaining about 50% is defined by the monofilament textile wires 20.

In the example shown in FIGS. 2 and 3, each of the three monofilament textile wires 20 is in mutual contact with the other two monofilament textile wires and only two of the three monofilament textile wires 20 are in contact with the multifilament textile yarn 30.

The monofilament textile wires 20 and the multifilament textile yarn 30 extend along a longitudinal direction A, shown in FIG. 2.

The twisting pitch P1 is preferably comprised between about 2 mm and about 20 mm, more preferably between about 3 mm and about 10 mm, for example equal to about 3.5 mm.

Each monofilament textile wire 20 is made of fibres made of aliphatic polyamide, for example Nylon 6, Nylon 6.6, Nylon 4.6, Nylon 4.10, Nylon 10.10, Nylon 11, Nylon 12, Nylon 6.10, Nylon 6.12, or of polyester fibres, for example polybutylene terephthalate (PBT), polyethylene terephthalate (PET), polyethylene isophthalate (PEI), or of polyaryletherketone fibres, for example polyether ether ketone (PEEK), or mixtures thereof.

The filaments 32 of the multifilament textile yarn 30 are made of aromatic polyamide fibres, or of aliphatic polyamide fibres, for example Nylon 6, Nylon 6.6, Nylon 4.6, Nylon 4.10, Nylon 10.10, Nylon 11, Nylon 12, Nylon 6.10, Nylon 6.12, or of polyester fibres, for example polybutylene terephthalate (PBT), polyethylene terephthalate (PET), polyethylene isophthalate (PEI), or of polyketone fibres, or of polyvinyl alcohol fibres, or of cellulose fibres, for example rayon or lyocell), or of glass or carbon fibres, or any other mixture of the aforementioned fibres, or assemblies of mixed fibres comprising two or more of the materials listed above. Such assemblies of mixed fibres are indicated hereinafter with the term "commingled fibres".

In the case of "commingled fibres", the fibres of the filaments 32 can for example comprise:

50% Aramid with linear density equal to about 1100 dTex and 50% PET with linear density equal to about 1100 dTex (such an assembly is indicated hereinafter as "Commingled 2200 dTex");

43% Aramid with linear density equal to about 840 dTex and 57% PET with linear density equal to about 1100 dTex (such an assembly is indicated hereinafter as "Commingled 1940 dTex");

33% Aramid with linear density equal to about 550 dTex and 67% PET with linear density equal to about 1100 dTex (such an assembly is indicated hereinafter as "Commingled 1650 dTex").

Irrespective of the specific type of textile material used for the filaments 32 of the multifilament textile yarn 30, such a material is suitably superficially adhesivised so as to offer adequate adhesivity to the surrounding elastomeric material. Typically, the adhesivization can be carried out through coating with an adhesive substance or through a chemical or physical treatment.

For example, the adhesivization is carried out through immersion of the hybrid reinforcing cord 10, after having twisted together the monofilament textile wires 20 with the multifilament textile yarn 30, in a solution comprising the adhesive substance.

Each monofilament textile wire 20 preferably has a diameter comprised between about 0.1 mm and about 1 mm, more preferably between about 0.2 mm and about 0.5 mm, also depending on the material from which it is made and the area of the tyre 100 in which the hybrid reinforcing cords 10 are arranged.

The multifilament textile yarn 30 preferably has a linear density comprised between about 400 dTex and about 4500 dTex, preferably between about 800 dTex and about 4000 dTex, also depending on the material from which it is made and the area of the tyre 100 in which the hybrid reinforcing cords 10 are arranged.

In specific embodiments, only the reinforcing cords 10', and not also the reinforcing cords 10*a*, 10*b*, 10*c* and 10*d*, or vice-versa, are hybrid reinforcing cords 10 of the type described above.

In other specific embodiments, only the reinforcing cords 10*a*, and not also the reinforcing cords 10', 10*b*, 10*c*, 10*d* or vice-versa, are hybrid reinforcing cords 10 of the type described above.

In some embodiments, only the reinforcing cords 10*a* and/or 10*b*, and not also the reinforcing cords 10', 10*c* and 10*d*, are hybrid reinforcing cords 10 of the type described above.

In yet other embodiments, only the reinforcing cords 10*d*, and not also the reinforcing cords 10', 10*a*, 10*b* and/or 10*c*, are hybrid reinforcing cords 10 of the type described above.

When the reinforcing cords 10*d* are hybrid reinforcing cords 10 of the type described above, such hybrid reinforcing cords 10 can be used only in the flipper 120 (if provided and when the chafer is not provided or is provided and comprises non-hybrid reinforcing cords), only in the chafer 121 (if provided and when the flipper is not provided or is provided and comprises non-hybrid reinforcing cords), or both in the flipper 120 and in the chafer 121 (if both are provided).

Figure 4:
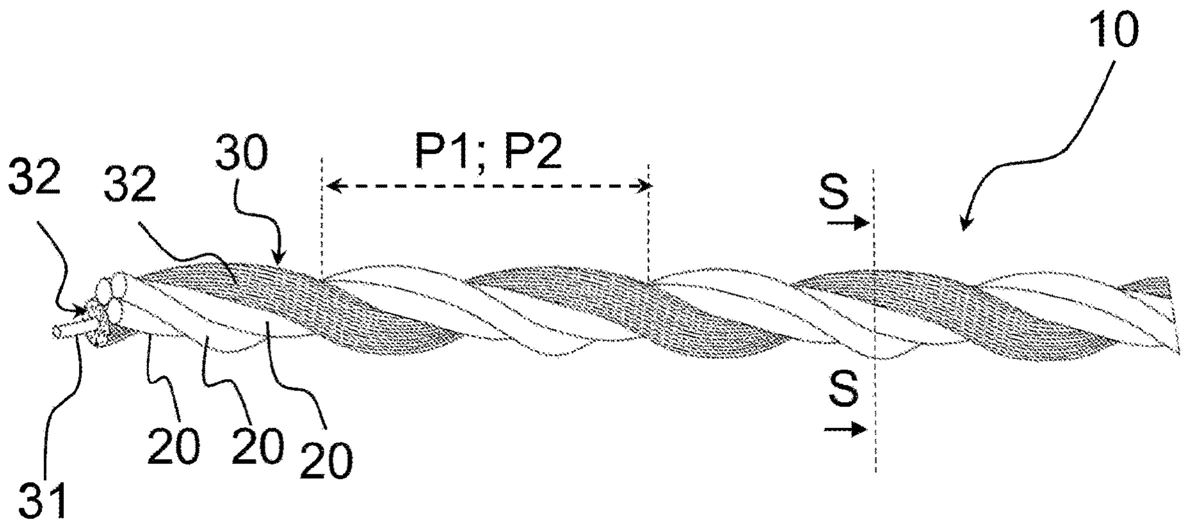
FIG. 4 is a schematic side view of a piece of a second embodiment of a hybrid reinforcing cord used in the tyre of FIG. 1.
Figure 5:
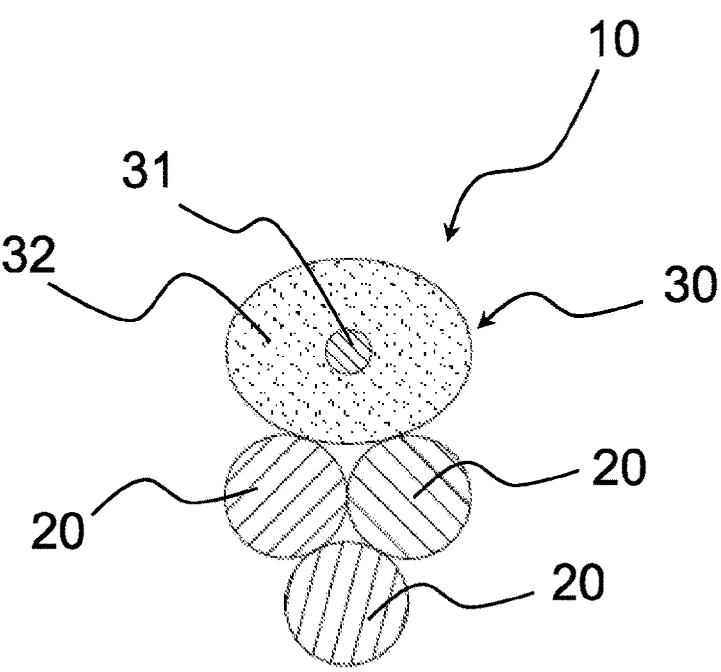
FIG. 5 is a schematic enlarged view of a cross section of the hybrid reinforcing cord of FIG. 4, such a cross section being taken on the section plane S-S drawn in FIG. 4.

FIGS. 4 and 5 show an embodiment of the hybrid reinforcing cord 10 that differs from that of the previous figures only in that the multifilament textile yarn 30 comprises a monofilament textile wire 31 incorporated among the filaments 32.

Figure 6:
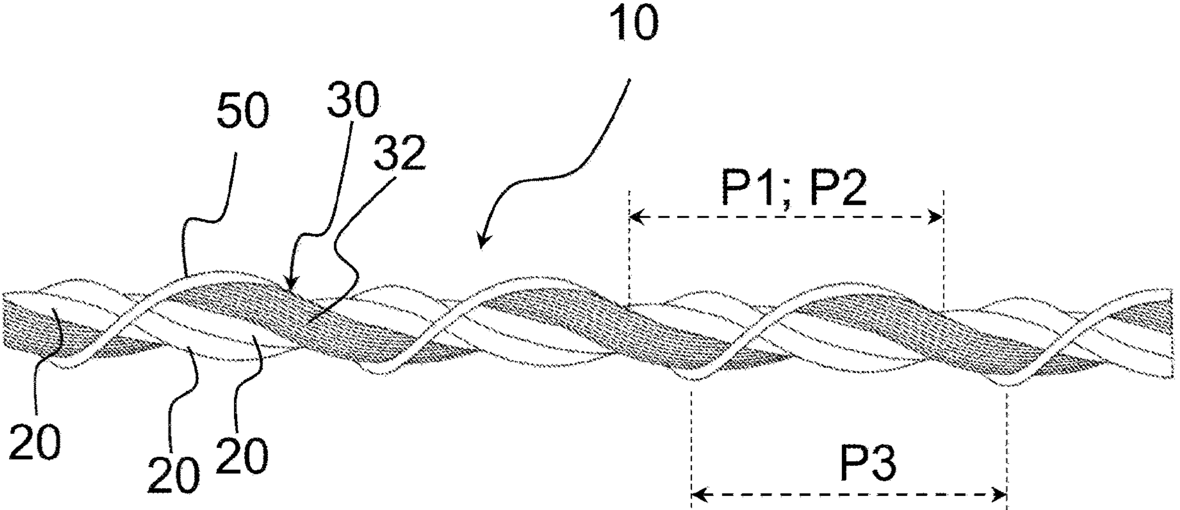
FIG. 6 is a schematic side view of a piece of a second embodiment of a hybrid reinforcing cord used in the tyre of FIG. 1.

FIG. 6 shows an embodiment of the hybrid reinforcing cord 10 that differs from that of the previous figures only in that the hybrid reinforcing cord 10 also comprises a metallic wire 50 helically wound around the monofilament textile wires 20 twisted together with the multifilament textile yarn 30.

In the illustrated embodiment, the winding direction of the metallic wire 50 is opposite to the twisting direction of the monofilament textile wires 20 which are twisted together with the multifilament textile yarn 30.

The winding of the metallic wire 50 has a winding pitch preferably comprised between about 2 mm and about 10 mm, more preferably between about 3.5 mm and about 5 mm, for example equal to about 4 mm.

The Applicant has made some samples of hybrid reinforcing cords 10 for the carcass structure 101, for the crossed belt structure 106, for the zero-degree reinforcing layer 106*c* and for the stiffening layers 120, 121 of the tyre 100 of the present invention.

For the use in the carcass structure 101 of a tyre 100 of the type shown in FIG. 1, and thus intended to be used in high and ultra-high performance automobiles as defined above, a hybrid reinforcing cord 10 has been made comprising three monofilament textile wires 20 made of nylon and each having a diameter equal to about 0.21 mm twisted with a multifilament textile yarn 30 made of nylon and having a linear density equal to about 1400 dTex. Such a reinforcing cord is briefly identified as: Ny 3×0.21 mm+Ny 1400 dTex.

For the use in the crossed belt structure 106 of a tyre 100 of the type shown in FIG. 1, and thus intended to be used in high and ultra-high performance automobiles as defined above, a hybrid reinforcing cord 10 has been made comprising three monofilament textile wires 20 made of PET and each having a diameter equal to about 0.40 mm twisted with a multifilament textile yarn 30 made of aramid and having a linear density equal to about 1100 dTex. Such a reinforcing cord is briefly identified as: PET 3×0.40 mm+Ar 1100 dTex.

For the use in the zero degrees belt layer 106*c* of a tyre 100 of the type shown in FIG. 1, and thus intended to be used in high and ultra-high performance automobiles as defined above, a hybrid reinforcing cord 10 has been made comprising two strands each of which comprising two monofilament textile wires 20 made of PET and each having a diameter equal to about 0.20 mm, the two strands being twisted to a multifilament textile yarn 30 made of aramid. The multifilament textile yarn 30 has a linear density equal to about 1100 dTex. Such a reinforcing cord is briefly identified as: PET 2×(2×0.20 mm)+Ar 1100 dTex.

The Applicant has also made reinforcing cords 10 for the stiffening layer 120 or 121 of the tyre 100. Such reinforcing cords 10 have the same structure and are made of the same materials described above with reference to the crossed belt structure 106.

Comparative Tests

On some of the reinforcing cords 10 described above the Applicant has carried out comparative tests with respect to conventional reinforcing cords currently used by the Applicant and currently deemed suitable for ensuring the desired driving performance and the desired behaviour of the tyre. Some of such tests are discussed hereinafter.

A test has been carried out in order to measure the hysteresis (energy dissipated after friction between the wires/filaments) of a piece of 200 mm of a hybrid reinforcing cord of the type Ny 3×0.21 mm+Ny 1400 dTex with respect to the hysteresis of a piece of 200 mm of a conventional reinforcing cord made by twisting together two yarns of nylon 1400 dTex (identified here as: 2×Ny 1400 dTex).

The reinforcing cords of both the pieces described above had substantially the same weight and the same volume and both of the pieces had substantially the same amount of elastomeric material. Therefore, both of the pieces described above had substantially the same weight.

Such pieces were subjected to 100 traction and compression cycles through a Zwick dynamometer, stressing the aforementioned pieces with a load increasing up to 12 N between a maximum elongation of 1.5% (equal to 3 mm) and a minimum elongation of 0.5% (equal to 1 mm) and with an application speed of the traction/compression equal to 50 mm/min. The average of the measurements carried out gave, as an indicative value of the energy dissipated, a value equal to 2.05 for the conventional reinforcing cord and equal to 2.24 for the hybrid reinforcing cord of the type Ny 3×0.21 mm+Ny 1400 dTex, confirming the better behaviour of the hybrid reinforcing cord of the invention in terms of hysteresis with respect to a conventional reinforcing cord comprising only multifilament textile yarns. This confirmed that it is advisable using the hybrid reinforcing cord of type Ny 3×0.21 mm+Ny 1400 dTex in the carcass structure of the tyre.

The Applicant has also carried out comparative tests to measure the bending stiffness of a hybrid reinforcing cord of the type PET 3×0.40 mm+Ar 1100 dTex with respect to that of a conventional reinforcing cord made of steel of the type 3×0.175 mm. For this purpose a test piece made of vulcanized elastomeric material comprising a plurality of hybrid reinforcing cords of the type PET 3×0.40 mm+Ar 1100 dTex, with thread count equal to 80 cords/dm (8 cords in 1 cm), and a test piece made of vulcanized elastomeric material comprising a plurality of conventional reinforcing cords made of steel of the type 3×0.175 mm, with thread count equal to 130 cords/dm (13 cords in 1 cm) were made.

The test piece comprising the hybrid reinforcing cords of the type PET 3×0.40 mm+Ar 1100 dTex had a thickness of elastomeric material equal to about 1.30 mm and a weight equal to about 1480 g/m$^2$, whereas the test piece comprising the conventional metallic reinforcing cords had a thickness of elastomeric material equal to about 0.80 mm and a weight equal to about 1470 g/m$^2$.

Both of the test pieces described above were subjected to a ring compression test as follows: the test pieces were folded and welded to create respective rings having a diameter of 80 mm. Such test pieces were subjected to an initial pretensioning of 0.5 N and to a crushing of 25 mm, with a compression speed of 100 mm/min.

The test piece comprising the hybrid reinforcing cords of the type PET 3×0.40 mm+Ar 1100 dTex withstood a maximum force of about 0.95 N, whereas the test piece comprising the conventional metallic reinforcing cords withstood a maximum force of about 0.86 N, confirming the better behaviour of the hybrid reinforcing cord of the invention in terms of bending stiffness with respect to a conventional metallic reinforcing cord. This confirmed that it is advisable using the hybrid reinforcing cord of the type PET 3×0.40 mm+Ar 1100 dTex in the belt structure of the tyre, as well as in the chafer and/or flipper.

The Applicant has also carried out comparative tests to measure the resistance to compression stresses of a hybrid reinforcing cord of the type PET 3×0.40 mm+Ar 1100 dTex with respect to that of conventional reinforcing cords made of steel of the type 3×0.175 mm.

The Applicant has indeed observed that, particularly with reference to the belt structure and to the chafer and/or flipper, among the stresses that can shorten the lifetime of the reinforcing cords dynamic compression stresses are of particular relevance. In particular, when subjected to repeated compression stresses, the reinforcing cords used in the aforementioned structural components of the tyre deform forming waves that lead to "unravelling", i.e. to the separation of the single wires/yarns, with consequent damaging of the tyre.

In order to evaluate the behaviour of the reinforcing cords with respect to the aforementioned compression stresses two test pieces were made each comprising two strips of vulcanized elastomeric material, each strip comprising a plurality of parallel reinforcing cords and the two strips being arranged inclined with respect to one another by an angle equal to about 30°.

One of the two test pieces (hereinafter indicated as "test piece A") comprised hybrid reinforcing cords of the type PET 3×0.40 mm+Ar 1100 dTex, with thread count equal to 80 cords/dm (8 cords in 1 cm), whereas the other test piece (hereinafter indicated as "test piece B") comprised conventional reinforcing cords made of steel of the type 3×0.175 mm, with thread count equal to 130 cords/dm (13 cords in 1 cm).

The test piece A had a thickness of elastomeric material equal to about 1.30 mm and a weight equal to about 1480 g/m$^2$, whereas the test piece B had a thickness of elastomeric material equal to about 0.80 mm and a weight equal to about 1470 g/m$^2$.

The two test pieces were vulcanized at 170° C. for 10 minutes and conditioned at room temperature for 16 hours.

Each of the two test pieces was subjected to bending/compression cycles in a testing machine of the De Mattia type until breaking occurred.

The test piece A resisted for a time period greater than about 40% with respect to that of the test piece B. This confirmed that it is advisable using the hybrid reinforcing cord of type PET 3×0.40 mm+Ar 1100 dTex in the belt structure of the tyre, as well as in the chafer and/or flipper.

In general, the comparative tests discussed above highlighted how, being substantially equal the weight of the semi-finished product that contains the reinforcing cords:

the hybrid reinforcing cords of the type Ny 3×0.21 mm+Ny 1400 have a better behaviour in terms of hysteresis with respect to that of the conventional reinforcing cords of the type 2×Ny 1400 dTex, therefore being suitable for being used in the carcass structure of tyres;

the hybrid reinforcing cords of the type PET 3×0.40 mm+Ar 1100 dTex have a better behaviour in terms of bending stiffness and resistance to compression stresses with respect to that of the conventional reinforcing cords made of steel of the type 3×0.175 mm currently used in the belt structure, as well as in the chafer and/or flipper, therefore being suitable for being used in the belt structure, as well as in the chafer and/or flipper, of tyres.

The present invention has been described with reference to some preferred embodiments. Different changes can be made to the embodiments described above, while still remaining within the scope of protection of the invention, defined by the following claims.

The invention claimed is:

1. A tyre for vehicle wheels, comprising a support structure and a tread band arranged in a radially outer position with respect to the support structure, wherein the support structure comprises a plurality of hybrid reinforcing cords, each hybrid reinforcing cord of the plurality of hybrid reinforcing cords having a plurality of monofilament textile wires twisted to at least one multifilament textile yarn, wherein, in any cross section of the hybrid reinforcing cord, at least one portion of at least one monofilament textile wire of the plurality of monofilament textile wires defines a first radially outer surface portion of the hybrid reinforcing cord and at least one portion of the at least one multifilament textile yarn defines a second radially outer surface portion of the hybrid reinforcing cord, wherein at least one first monofilament textile wire of the plurality of monofilament textile wires is twisted together with the at least one multifilament textile yarn with a predetermined first twisting pitch (P1) to form a strand of mono-multifilament textile wires and at least one second monofilament textile wire of the plurality of monofilament textile wires is twisted together with the strand of mono-multifilament textile wires with a predetermined second twisting pitch (P2).

2. The tyre according to claim 1, wherein the first radially outer surface portion is defined by at least one portion of at least two of the monofilament textile wires.

3. The tyre according to claim 1, wherein each monofilament textile wire of the plurality of monofilament textile wires is made of one or more of aliphatic polyamide fibres, polyester fibres, polyaryletherketone fibres, and mixtures thereof; and wherein the at least one multifilament textile yarn comprises textile filaments made of one or more of aromatic polyamide fibres, aliphatic polyamide fibres, polyester fibres, polyketone fibres, polyvinyl alcohol fibres, cellulose fibres, glass fibres, carbon fibres, and mixtures thereof.

4. The tyre according to claim 1, wherein the hybrid reinforcing cords comprises a number of multifilament textile yarns ranging from 1 to 4.

5. The tyre according to claim 1, wherein at least some of the hybrid reinforcing cords comprise at least one metallic wire helically wound around the plurality of monofilament textile wires and the at least one multifilament textile yarn.

6. The tyre according to claim 1, wherein the support structure comprises:

a carcass structure comprises at least one carcass layer having opposite end edges associated with respective annular anchoring structures to define, on opposite sides with respect to an equatorial plane (M-M) of the tyre, respective bead structures; and a crossed belt structure arranged in a radially outer position with respect to the carcass structure and in a radially inner position with respect to the tread band and comprising at least two belt layers arranged radially superimposed over one another, each belt layer comprising a plurality of the hybrid reinforcing cords, the hybrid reinforcing cords of one of the belt layers extending parallel to one another and having a crossed orientation with respect to the reinforcing cords of another belt layer wherein the hybrid reinforcing cords are arranged in at least one of:

the carcass structure;

the crossed belt structure; and at least one stiffening layer associated with the at least one carcass layer at or close to a respective end edge of the at least one carcass layer;

a zero-degree reinforcing layer arranged in a radially inner position with respect to the tread band.

7. The tyre according to claim 1, wherein each monofilament textile wire of the plurality of monofilament textile wires has a diameter ranging from about 0.1 mm to 1 mm.

8. The tyre according to claim 1, wherein the hybrid reinforcing cords comprises a number of monofilament textile wires ranging from 2 to 10.

9. The tyre according to claim 1, wherein the at least one multifilament textile yarn has a linear density ranging from about 400 dTex to about 4500 dTex.

10. A tyre for vehicle wheels, comprising a support structure and a tread band arranged in a radially outer position with respect to the support structure, wherein the support structure comprises a plurality of hybrid reinforcing cords, each hybrid reinforcing cord of the plurality of hybrid reinforcing cords having a plurality of monofilament textile wires twisted to at least one multifilament textile yarn, wherein, in any cross section of the hybrid reinforcing cord, at least one portion of at least one monofilament textile wire of the plurality of monofilament textile wires defines a first radially outer surface portion of the hybrid reinforcing cord and at least one portion of the at least one multifilament textile yarn defines a second radially outer surface portion of the hybrid reinforcing cord, wherein the at least one multifilament textile yarn comprises at least one textile monofilament and a plurality of textile filaments, wherein in any cross section of the hybrid reinforcing cord, the at least one textile monofilament is at least partially incorporated among the textile filaments.

11. The tyre according to claim 10, wherein the first radially outer surface portion is defined by at least one portion of at least two of the monofilament textile wires.

12. The tyre according to claim 10, wherein the plurality of monofilament textile wires are twisted together with a predetermined first twisting pitch (P1) to form a strand of monofilament textile wires, and the at least one multifilament textile yarn is twisted together with the strand of monofilament textile wires with a predetermined second twisting pitch (P2).

13. The tyre according to claim 10, wherein at least one first monofilament textile wire of the plurality of monofilament textile wires is twisted together with the at least one multifilament textile yarn with a predetermined first twisting pitch (P1) to form a strand of mono-multifilament textile wires and at least one second monofilament textile wire of the plurality of monofilament textile wires is twisted together with the strand of mono-multifilament textile wires with a predetermined second twisting pitch (P2).

14. The tyre according to claim 10, wherein each monofilament textile wire of the plurality of monofilament textile wires is twisted together with at least another monofilament textile wire of the plurality of monofilament textile wires and to the at least one multifilament textile yarn with the predetermined twisting pitch (P1) to form the strand of mono-multifilament textile wires.

15. The tyre according to claim 10, wherein each monofilament textile wire of the plurality of monofilament textile wires is made of one or more of aliphatic polyamide fibres, polyester fibres, polyaryletherketone fibres, and mixtures thereof, and wherein the at least one multifilament textile yarn comprises textile filaments made of one or more of aromatic polyamide fibres, aliphatic polyamide fibres, polyester fibres, polyketone fibres, polyvinyl alcohol fibres, cellulose fibres, glass fibres, carbon fibres, and mixtures thereof.

16. The tyre according to claim 10, wherein each monofilament textile wire of the plurality of monofilament textile wires has a diameter ranging from about 0.1 mm to 1 mm.

17. The tyre according to claim 10, wherein the hybrid reinforcing cords comprises a number of monofilament textile wires ranging from 2 to 10.

18. The tyre according to claim 10, wherein the at least one multifilament textile yarn has a linear density ranging from about 400 dTex to about 4500 dTex.

19. The tyre according to claim 10, wherein the hybrid reinforcing cords comprises a number of multifilament textile yarns ranging from 1 to 4.

20. The tyre according to claim 10, wherein at least some of the hybrid reinforcing cords comprise at least one metallic wire helically wound around the plurality of monofilament textile wires and the at least one multifilament textile yarn.

21. The tyre according to claim 10, wherein the support structure comprises:

a carcass structure comprising at least one carcass layer having opposite end edges associated with respective annular anchoring structures to define, on opposite sides with respect to an equatorial plane (M-M) of the tyre, respective bead structures;

a crossed belt structure arranged in a radially outer position with respect to the carcass structure and in a radially inner position with respect to the tread band and comprising at least two belt layers arranged radially superimposed over one another, each belt layer comprising a plurality of the hybrid reinforcing cords, the hybrid reinforcing cords of one of the belt layers extending parallel to one another and having a crossed orientation with respect to the reinforcing cords of another belt layer;

wherein the hybrid reinforcing cords are arranged in at least one of:

the carcass structure;

the crossed belt structure;

at least one stiffening layer associated with the at least one carcass layer at or close to a respective end edge of the at least one carcass layer;

a zero-degree reinforcing layer arranged in a radially inner position with respect to the tread band.

* * * * *